UNITED STATES PATENT OFFICE.

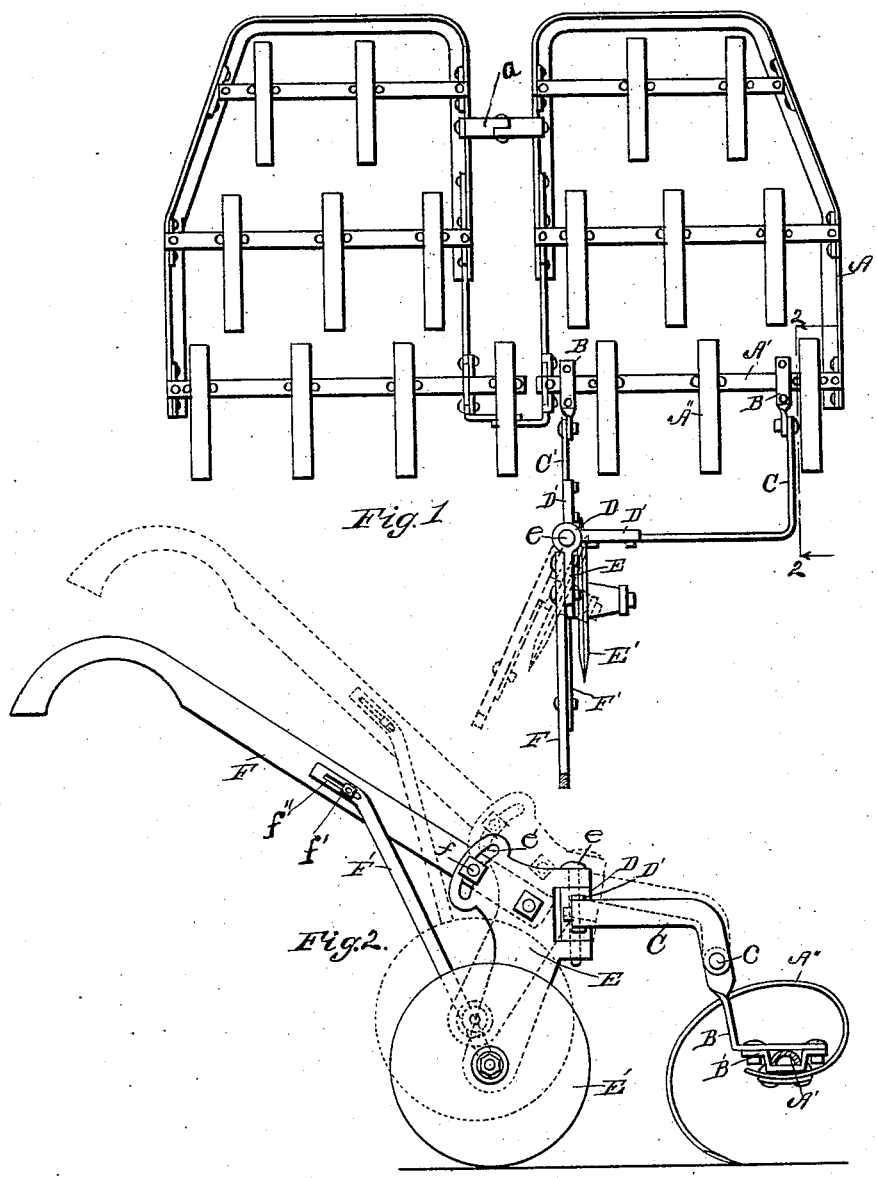

HALE V. ABBOTT AND NATHAN W. ABBOTT, OF LAWTON, MICHIGAN.

HARROW.

No. 848,525.  Specification of Letters Patent.  Patented March 26, 1907.

Application filed April 9, 1906. Serial No. 310,756.

*To all whom it may concern:*

Be it known that we, HALE V. ABBOTT and NATHAN W. ABBOTT, citizens of the United States, residing at Lawton, in the county of Van Buren and State of Michigan, have invented certain new and useful Improvements in Harrows, of which the following is a specification.

This invention relates to steering means for harrows.

The main object of this invention is to provide an improved guiding means for harrows and similar tools which may be effectively controlled by the operator, thereby adapting a harrow for use in orchards, vineyards, and the like.

It is also an object of our invention to provide a simple and effective steering means which can be attached to harrows already in use or to any harrow, although the harrow may be of a new design, whereby the harrow may be effectively guided.

Further objects and objects relating to details of construction will definitely appear from the detailed description to follow.

We accomplish the objects of our invention by the devices and means described in the following specification.

The invention is clearly defined and pointed out in the claims.

A structure embodying the features of our invention is clearly illustrated in the accompanying drawings, forming a part of this specification, in which—

Figure 1 is a plan view of a structure embodying the features of our invention, the steering means being shown in one of its adjusted positions by dotted lines; and Fig. 2 is an enlarged detail vertical section taken on a line corresponding to line 2 2 of Fig. 1 looking in the direction of the little arrows at the ends of the section-lines, the steering-wheel being shown in an elevated position by dotted lines.

In the drawings similar letters of reference refer to similar parts in both views.

Referring to the drawings, the harrow may be of any design of float-harrow. It is preferably made up of sections or wings A, secured together by hinges $a$. To the rear cross-piece A' of the frame of one of the sections we secure by suitable clips B' the rearwardly and upwardly projecting arms B. To these arms we secure by horizontally-arranged pivots $c$ a suitable frame consisting of arms C and C', secured to a block D by projecting arms D'. A standard E is secured to this rectangular frame by the vertical pivot $e$. A steering-disk E', with sharp edge, is journaled on a horizontal journal upon the lower end of the standard E. A steering-handle projects rearwardly from the standard E. This handle is adjustably secured to the standard E by a bolt $f$, which is arranged in the slot $e'$ in the standard. A brace F' is provided for the handle. This brace extends from the lower end of the standard up to the handle and is secured thereto by a bolt $f'$, which is arranged through the slot $f''$ in the brace. By thus securing the handle it may be adjusted vertically to bring the same to a proper height for the particular user. By thus arranging the parts we provide a harrow which may be steered close to the trees or vines in an orchard or vineyard without danger of engaging the same, as the harrow is held steadily in position by the steering-wheel. It is found in practice that in harrowing orchards and vineyards a harrow is likely when driven close to trees or vines or their bases to be thrown into contact with the trees or vines, injuring the same in spite of the care of the operator. With our improvements, as above stated, the ground may be harrowed close to the trees or vines without liability of injuring the same.

A further advantage is that the ground or space between the trees or vines may be harrowed by working the harrow in and out while driving along the rows by means of the steering-wheel. By placing the steering-wheel at the inner rear corner of the frame, as illustrated and described, it is brought into position to operate most effectively and does not interfere with the usual operation of the harrow.

When not in use, the steering device can be folded over upon the harrow, so that the space required for storage is not materially increased on account of the steering attachments.

Our improved steering device is comparatively light and is very easy to manipulate. It is very easy to manufacture and is readily attached to any harrow. We have illustrated and described the same in detail in the form preferred by us, although we are aware that it is capable of variation in structural details without departing from our invention.

Having thus described our invention, what we claim as new, and desire to secure by Letters Patent, is—

1. An attachment for a harrow consisting of the clip-pieces B arranged to attach to one of the cross-bars of the harrow; a frame pivoted by horizontal pivots to said clip-pieces; a standard arranged to swing on a vertical pivot, carried by the said frame; a steering disk-like wheel on the horizontal journal on said standard; and a steering-handle secured to said standard, coacting for the purpose specified.

2. An attachment for a harrow, consisting of a frame supported on a horizontal pivot; a vertical pivot carried by the frame; a standard arranged to swing on said vertical pivot; a disk-like wheel on a horizontal journal on said standard; and a rearwardly-extending steering-handle secured to said standard by which it may be raised from the ground or thrown into the ground and pressure applied thereto, or turned on its pivot, coacting for the purpose specified.

3. The combination of a harrow made up of sections hinged together; a pair of upwardly and rearwardly projecting arms secured to the frame of one of said sections; a rectangular frame secured to said arms by horizontally-arranged pivots; a standard secured at the inner rear corner of said frame, by a vertical pivot; a disk-like wheel journaled on said standard; and an upwardly and rearwardly projecting handle secured to said standard, for the purpose specified.

4. The combination of a harrow made up of sections hinged together; a pair of upwardly and rearwardly projecting arms secured to the frame of one of said sections; a frame secured to said arms by horizontally-arranged pivots; a standard secured to said frame, by a vertical pivot; a disk-like wheel journaled on said standard; and a handle for said standard, for the purpose specified.

5. The combination with a float-harrow, of a frame connected to said harrow by a horizontally-arranged pivot; a vertical pivot; a standard journaled on said pivot and secured to said frame thereby; a disk-like wheel journaled on said standard; and a rearwardly-extending steering-handle for said standard by which it may be raised from the ground or thrown into the ground and pressure applied thereto, or turned on its pivot, for the purpose specified.

In witness whereof we have hereunto set our hands and seals in the presence of two witnesses.

HALE V. ABBOTT. [L. S.]
NATHAN W. ABBOTT. [L. S.]

Witnesses:
LOWELL PACKER,
GEO. SHOWERS.